3,823,135
PYRIMIDONE HERBICIDES
Kurt H. G. Pilgram and Richard D. Skiles, Modesto, Calif., assignors to Shell Oil Company
No Drawing. Filed Dec. 26, 1972, Ser. No. 318,317
Int. Cl. C07d 51/38
U.S. Cl. 260—251 R  4 Claims

ABSTRACT OF THE DISCLOSURE 2,5-dihalo-3-(optionally substituted-phenyl) - 6-alkyl-4 (3H)-pyrimidones, and their use as herbicides.

DESCRIPTION OF THE PRIOR ART

A search has revealed the following patents relating to pyrimidones: U.S. Pats. 3,185,689, 3,378,557, 3,435,035 and 3,580,913; Canadian Pat. 807,126; Belgian Pat. 637,891; Japanese Pats. 4,261/67 and 10,874/67; South African Pat. 64/2,590; and Swiss Pats. 433,341 and 433,342.

SUMMARY OF THE INVENTION

It has been found that 4(3H)-pyrimidones substituted at the 2- and 5-positions by halogen, at the 3-position by optionally substituted phenyl and by alkyl at the 6-position, are potent herbicides.

THE PREFERRED EMBODIMENTS OF THE INVENTION

The compounds of this invention can be described by the formula

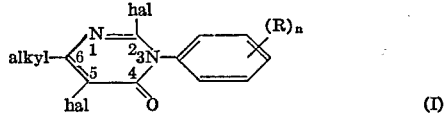

(I)

wherein "alkyl" is alkyl from 1 to 4 carbon atoms, each "hal" is halogen selected from chlorine and bromine, R is trifluoromethyl, $n$ is 0 or 1.

In these compounds, the alkyl moiety is suitably either of branched-chain or straight-chain configuration.

Because of their properties, compounds of this class wherein $n=0$, and $n=1$, R=—CF$_3$, substituted on the 3-position of the ring, and each "hal" is chlorine or bromine, are preferred. Of this subclass, those compounds wherein "alkyl" is methyl appear to be of most interest.

Typical species of this class of compounds are described in the examples set forth hereinafter.

The 2-chloro compounds of this invention can be prepared from the corresponding uracils of the formula

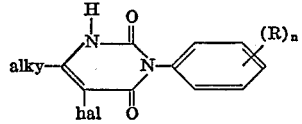

by treating the uracil with phosphorus oxychloride at a temperature of about 80–115° C., optionally in the presence of a catalytic amount of dimethylformamide or an N,N-dialkylaniline. The reaction is conveniently carried out using an excess of the phosphorus oxychloride as the reaction medium. The 2-bromo compounds of this invention are prepared in a similar way from phosphorus oxybromide.

Methods for preparing the uracils are known, being described in, for example, U.S. Pat. 3,274,196 and British Pat. 968,655.

Preparation of the compounds of the invention is illustrated and exemplified in the following examples of the preparation of particular species. In all cases, the identity of the product (and any intermediate involved) was confirmed by elemental analysis and infrared and nuclear magnetic resonance spectral analyses.

EXAMPLE I 5-bromo-2-chloro-6-methyl-3-phenyl-4(3H)-pyrimidinone (I)

A mixture of 72.0 grams (0.256 mole) of 5-bromo-6-methyl-3-phenyl-uracil (U.S. 3,274,196) and 5 drops of dimethylformamide in 500 milliliters of phosphorus oxychloride was refluxed with stirring for 20 hours. The excess phosphorus oxychloride was distilled under reduced pressure and the residue was dissolved in methylene chloride, washed with water, dried over anhydrous magnesium sulfate, filtered and purified by silica-chromatography to give 32.0 grams of (I) as a light-yellow crystalline solid, melting point: 158–161° C.

EXAMPLE II 2,5-dichloro-6-methyl-3-phenyl-4(3H)-pyrimidinone (II)

(II) was prepared as a light yellow crystalline solid, melting point 158-161° C., by a procedure similar to that described in Example I, starting from 5-chloro-6-methyl-3-phenyluracil (British Pat. 968,665).

EXAMPLE III 5-bromo-2-chloro-6-methyl-3-($\alpha,\alpha,\alpha$-trifluoro-3-tolyl)-4(3H)-pyrimidinone (III)

(a) 3-(3-($\alpha,\alpha,\alpha$-trifluoro-3-tolyl)ureido)crotonic acid, ethyl ester (IV).—A solution of 12.9 grams (0.1 mole) of ethyl $\beta$-aminocrotonate and 18.7 grams (0.1 mole) of $\alpha,\alpha,\alpha$-trifluoro-3-tolyl isocyanate in 150 milliliters of dry ether was prepared. After 24 hours at room temperature, the colorless crystalline solid which had formed was collected on a filter and dried to give 28.0 grams of (IV), melting point: 140–143° C.

(b) 6-methyl-3-($\alpha,\alpha,\alpha$-trifluoro-3-tolyl)uracil (V).—A mixture of 28.0 grams (0.089 mole) of (IV) in 250 milliliters of water containing 9.0 grams of sodium hydroxide was heated to reflux with stirring for one hour, then acidified with hydrochloric acid and filtered. Recrystallization of the filter cake from methanol afforded 9.0 grams of (V) as a colorless solid, melting point: 250–252° C.

(c) 5-bromo - 6 - methyl - 3 - ($\alpha,\alpha,\alpha$-trifluoro-3-tolyl) uracil (VI).—To a suspension of 26.5 grams (0.1 mole) of (V) in 120 milliliters of glacial acetic acid was added 32 grams (0.2 mole) of bromine dropwise over a 10-minute period, the mixture being held at 80–85° C. After 2 hours, acetic acid was distilled under reduced pressure. The residual solid was treated with water, filtered, washed with ether and dried to give 20.0 grams of (VI) as a colorless solid, melting point: 260–263° C.

(d) (III).—(III) was prepared as a light-yellow crystalline solid, melting point: 146–149° C., from (VI) by a procedure similar to that described in Example I.

Compounds of this invention have been found to be herbicidally effective with regard to a variety of plant species, including economically important species of grasses and broad-leaved weeds. They have been found to be active both pre-emergence (applied to the soil prior to germination of the plant seeds) and post-emergence (applied to the foliage of the plant).

For use as herbicides, the compounds of this invention can be applied by conventional techniques, employing conventional formulations.

The amount of the pyrimidone required for controlling unwanted plants will naturally depend upon the variety or varieties of plants involved, whether the herbicide is to be applied pre-emergence or post-emergence, the kind and condition of the soil (if applied pre-emergence) or the condition of the plants (if applied post-emergence), the degree of control desired, the character of the formulation used, the mode of application, the climate, the season of the year and other variables which must be and are taken into account in conventional practice. Recommendation as to precise dosages are therefore not possible. In general, however, when applied pre-emergence to a locus to be protected, dosages of from about 0.1 to about 10 pounds per acre of the pyrimidone will be satisfactory. When applied post-emergence, the usual practice is to spray or dust the foliage of the plants to apply the needed dosage to the foliage. Liquid and dust formulations for such application ordinarily contain from about ½ to 10% of the pyrimidone.

The compositions of the invention may also contain other ingredients, for example, other compounds possessing pesticidal, especially insecticidal, acaricidal, herbicidal or fungicidal, properties.

The herbicidal activity of compounds of this invention was determined with respect to several common species of weeds, by spraying a formulation of the test compound on to the soil in which the weed seeds had been planted (pre-emergence test) or on to the foliage of the plants (post-emergence tests). In each series of tests, the soil was held in containers that isolated that soil into a narrow band, or row. The solution of test chemical was sprayed over the band, from one end to the other, the concentration of the test compound in the formulation varying logarithmically from a higher value at one end of the band to a lower value at the other end of the band. The effect of the test chemical was evaluated visually and reported as the nominal rate of application, in pounds of test chemical per acre of the soil band, at which 90% inhibition of the growth of the weeds occurred, this being referred to as the 90% growth inhibition, or $GI_{90}$, dosage.

Results of the pre-emergence tests, as well as the weed species involved, are set out in Table I, while similar data for the post-emergence tests are set out in Table II.

TABLE I.—PRE-EMERGENCE TESTS

| Compound of example | Weed species | | | | | | | |
|---|---|---|---|---|---|---|---|---|
| | Rye-grass | Cheat-grass | Crab-grass | Water grass | Pig-weed | Mustard | Sow-thistle | Curly dock |
| 1 | [1] <0.9 | <0.9 | <0.9 | <0.7 | 7.0 | <0.9 | <0.9 | <0.9 |
| 2 | 1.0 | 1.0 | 3.0 | 3.0 | >10 | <1.0 | <1.0 | <1.0 |
| 3 | 1.1 | 1.8 | <1.0 | 6.0 | >10 | 1.3 | 2.5 | 1.1 |

[1] The symbol < means "less than;" the symbol > means "more than."

TABLE II.—POST-EMERGENCE TESTS

| Compound of example | Weed species | | | | | | | |
|---|---|---|---|---|---|---|---|---|
| | Rye-grass | Cheat-grass | Crab-grass | Water grass | Pig-weed | Mustard | Sow-thistle | Curly dock |
| 1 | 3.0 | 3.5 | [1] <1.0 | 7.0 | 6.0 | <1.0 | <1.0 | <1.0 |
| 2 | | | | | | | | |
| 3 | | | | | | | | |

[1] The symbol < means "less than."

We claim as our invention:
1. A compound of the formula:

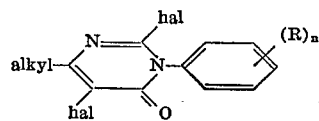

wherein "alkyl" is alkyl of from 1 to 4 carbon atoms, each "hal" is bromine or chlorine, and $n$ is zero, or $n$ is one and R is trifluoromethyl.

2. A compound according to claim 1 wherein "alkyl" is methyl, "hal" at the 5-position is bromine, "hal" at the 2-position is chlorine, $n=1$, and R is trifluoromethyl at the 3-position.

3. A compound according to claim 1 wherein "alkyl" is methyl, "hal" at the 5-position is bromine, "hal" at the 2-position is chlorine and $n=0$.

4. A compound according to claim 1 wherein "alkyl" is methyl, both "hal" are chlorine and $n=0$.

References Cited
UNITED STATES PATENTS
3,557,112  1/1971  D'Amico _____ 260—251

RAYMOND V. RUSH, Primary Examiner

U.S. Cl. X.R.
71—92